United States Patent [19]
Carlo et al.

[11] Patent Number: 5,365,215
[45] Date of Patent: Nov. 15, 1994

[54] VEHICLE STEERING LOCK WITH AUDIBLE SIGNAL

[75] Inventors: Louis D. Carlo, Litchfield; Danut Voiculescu, Cleveland; John Rutkowski, Cuyahoga Falls, all of Ohio

[73] Assignee: Winner International, Sharon, Pa.

[21] Appl. No.: 7,270

[22] Filed: Jan. 21, 1993

[51] Int. Cl.⁵ .............................................. B60R 25/10
[52] U.S. Cl. .................................. 340/426; 340/425.5; 340/429; 340/457
[58] Field of Search ...................... 340/426, 425.5, 429, 340/457, 691, 692, 693; 70/14, 205; 292/147

[56] References Cited
U.S. PATENT DOCUMENTS
| | | | |
|---|---|---|---|
| 4,738,127 | 4/1988 | Johnson | 70/209 |
| 4,961,331 | 10/1990 | Winner | 70/209 |
| 5,055,823 | 10/1991 | Fuller | 340/429 |

*Primary Examiner*—John K. Peng
*Assistant Examiner*—Daryl C. Pope
*Attorney, Agent, or Firm*—Vickers, Daniels & Young

[57] ABSTRACT

An anti-theft device for attachment to a steering wheel of a vehicle and comprising telescoping components relatively displaceable between extended and retracted positions respectively corresponding to use and storage positions for the device is provided with an electric circuit which is activated in the stored position of the device and issues an audible signal to remind the operator of the vehicle to attach the device to the vehicle steering wheel when the operator leaves the vehicle. The electric circuit includes a vibration sensor for sensing vibration of the device such as when the vehicle motor is running or the vehicle is moving along a roadway. When the vehicle is parked and the motor turned off, whereby there is no vibration of the device, an audible signal is issued, such as a digitized voice message for example, to remind the operator to install the device before leaving the vehicle.

19 Claims, 2 Drawing Sheets

VEHICLE STEERING LOCK WITH AUDIBLE SIGNAL

BACKGROUND OF THE INVENTION

The present invention relates to the art of vehicle anti-theft devices and, more particularly, to an improvement in such devices which promotes the use thereof.

The present invention finds particular utility in connection with vehicle anti-theft devices which are mechanically operable to restrain rotation of the vehicle steering wheel, thus to preclude rotation of the steering wheel which would be sufficient for driving the vehicle. Such vehicle steering lock devices are shown, for example, in U.S. Pat. Nos. 4,738,127 to Johnson and 4,961,331 to Winner, the disclosures of which are incorporated by reference herein for background information. These devices include a pair of attachment components in the form of hooks, each on a different one of a pair of telescopically interengaged members of the device, whereby the hooks are adapted to be relatively displaced between retracted and extended positions relative to one another and which positions correspond, respectively, to storage and use positions for the device. In use of the Johnson device, the hooks engage diametrically opposed portions of the steering wheel rim of a vehicle and the device includes a portion extending radially outwardly of the rim to preclude rotation of the steering wheel by engagement of the extended portion with the interior of the vehicle or the operator thereof. In use of the Winner device, one hook engages the steering wheel rim and the other engages a foot pedal lever on the floor of the vehicle, whereby both rotation of the steering wheel and depression of the foot pedal are restrained so as to preclude unauthorized operation of the vehicle. When not in use, the attachment components of the devices are displaced to the retracted positions thereof to promote compactness of the device for storage in the vehicle, such as under the front seat, on the floor behind the front seat or in the trunk of the vehicle.

While mechanically operable vehicle anti-theft devices such as those shown in the Johnson and Winner patents are extremely effective anti-theft devices, such a device can only function as such if it is installed by the operator when leaving the vehicle unattended. The device is most often stored in an area of the vehicle where the device is not visible to the operator, and this frequently results in the operator forgetting to install the device when leaving the vehicle, whereby the latter is left unprotected against theft.

SUMMARY OF THE INVENTION

The present invention advantageously overcomes the foregoing problem by providing a vehicle anti-theft device, such as a steering wheel locking device, with an audible signal which reminds the operator to install the anti-theft device upon leaving the vehicle. More particularly in accordance with the invention, a mechanically operable anti-theft device is provided with an electric circuit which is activated when the component parts of the device are in their storage positions and which, when activated, is adapted to sense a condition indicative of parking of the vehicle and, in response to sensing the condition, to issue an audible signal, whereby the operator is reminded to install the device upon leaving the vehicle. More particularly in this respect, the circuit includes a vibration sensor which, in response to parking and turning off of the vehicle motor, outputs a signal indicative of no vibration and in response to which the audible signal is issued. The circuit, and thus the audible signal, is deactivated by displacement of the component parts of the device to their use positions, such as by installation of the device by the operator in response to the audible signal. If the operator does not install the device within a predetermined period of time, the audible signal can be repeated and/or the circuit becomes dormant until again activated by vibration of the device. When the motor of the vehicle is subsequently restarted, the circuit is again enabled and responds to the next sensing of no vibration to operate in the foregoing manner.

In accordance with a preferred embodiment of the invention to be described in detail hereinafter, the circuit is battery operated and includes a microprocessor, a vibration sensor, a timer, an activating switch and an audible signal generator which, preferably, outputs a digitized voice message. The circuit is advantageously housed within the tubular body portion of one of the component parts of a steering wheel lock, thus to protect the component parts of the circuit from damage and from exposure to dirt and other contaminants which may be present in the environment of the vehicle during storage of the device. The activating switch is actuated between open and closed positions to respectively open and close the circuit by a second component part of the anti-theft device which, in the preferred embodiment, includes a rod member suitably received in the tubular body portion and having an inner end operable to actuate the activating switch between its open and closed positions when the attachment components of the anti-theft device are respectively in the use and storage positions thereof.

It is accordingly an outstanding object of the present invention to provide a mechanically operable vehicle anti-theft device which is stored in the vehicle when not in use with an audible signal producing arrangement to remind the operator of the vehicle to install the anti-theft device before leaving the vehicle unattended.

Another object is to provide a vehicle anti-theft device with an audible signal producing arrangement of the foregoing character which is activated in response to parking a vehicle and turning off the motor thereof.

A further object is the provision of a vehicle anti-theft device with an audible signal producing arrangement of the foregoing character which includes an electric circuit activated in response to vibrations sensed during movement of a vehicle or running of the motor thereof and which, upon sensing termination of such vibration, operates to issue the audible signal.

Still another object is the provision of a vehicle anti-theft device with an audible signal producing arrangement of the foregoing character in which the audible signal is a digitized voice message reminding the operator to install the anti-theft device before leaving the vehicle.

Yet a further object is to provide a vehicle anti-theft device with an audible signal producing arrangement of the foregoing character which, in the absence of operator installation of the anti-theft device, discontinues the audible signal after a predetermined period of time and renders the circuit dormant until reactivated by subsequent vibration of the device.

A further object is the provision of a vehicle anti-theft device with an audible signal producing arrangement of the foregoing character which is totally enclosed within the anti-theft device.

BRIEF DESCRIPTION OF THE DRAWINGS

The foregoing objects, and others, will in part be obvious and in part pointed out more fully hereinafter in conjunction with the written description of a preferred embodiment of the invention illustrated in the accompanying drawings in which.

DETAILED DESCRIPTION OF THE PREFERRED EMBODIMENT

Figure 1:
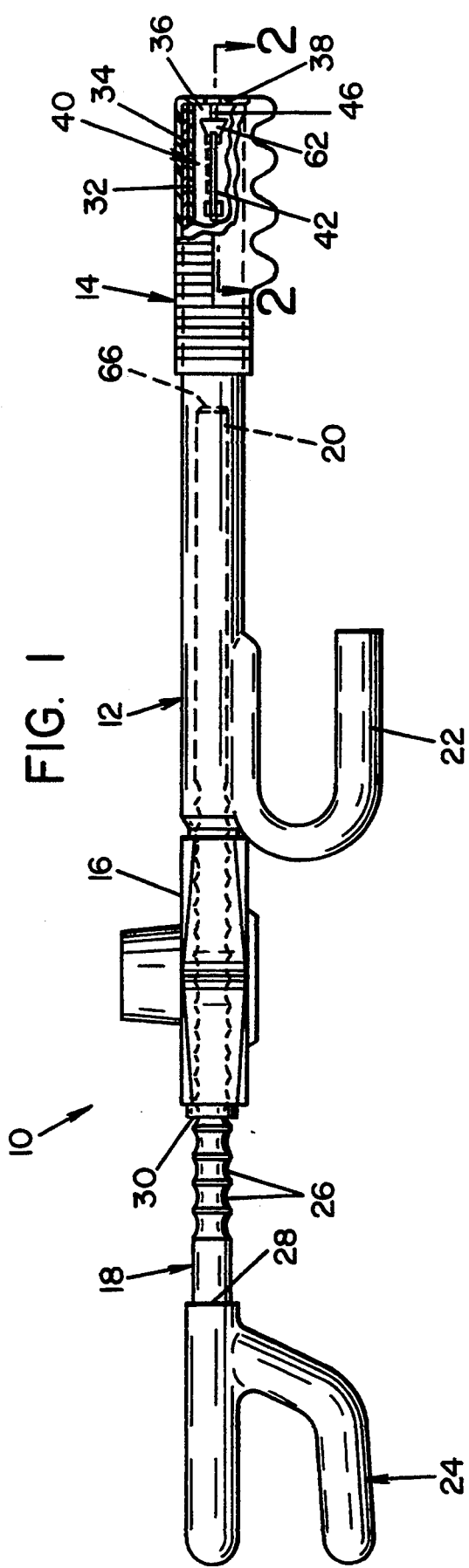
FIG. 1 is a side elevation view of a vehicle anti-theft device adapted to be mounted on the steering wheel of a vehicle.

Referring now in greater detail to the drawings wherein the showings are for the purpose of illustrating a preferred embodiment of the invention only and not for the purpose of limiting the invention, FIG. 1 illustrates a vehicle anti-theft steering wheel lock 10 of the type illustrated in the aforementioned patent to Johnson incorporated herein by reference, whereby a detailed description of the structure and operation thereof will not be necessary. Briefly, and as disclosed in the Johnson patent, anti-theft device 10 includes an elongated tubular body portion 12 having an outer end provided with a hand grip 14 and an inner end attached to lock housing 16, and an elongated steel rod 18 axially slidably received in lock housing 16 and body portion 12 and having an inner end 20 in body portion 12. attachment components in the form of hooks 22 and 24 are provided respectively on body portion 12 and rod 18 and are adapted to engage diametrically opposed portions of a vehicle steering wheel from the inside thereof when the device is installed on the steering wheel. Rod 18 is provided with annular grooves 26 along the length thereof which cooperate with a ball detent mechanism, not shown, in lock housing 16 to axially hold rod 18 in an adjusted position thereof relative to body portion 12. Lock housing 16 also includes a locking mechanism, not illustrated, for locking rod 18 in its adjusted position. When the anti-theft device is not in use, rod 18 is fully retracted into body portion 12 such that shoulder 28 of hook 24 engages against shoulder 30 of lock housing 16. When the device is installed, hook 22 is engaged against the inner side of the steering wheel rim and rod 18 is extended relative to body portion 12 for hook 24 to engage against the inner side of the diametrically opposed portion of the steering wheel rim. It will be appreciated, therefore, that the attachment components 22 and 24 of the anti-theft device are relatively displaceable between retracted and extended positions relative to one another and which positions respectively correspond to storage and use positions for the attachment components and thus the anti-theft device.

In the embodiment illustrated, tubular body portion 12 is comprised of inner and outer steel tubes 32 and 34, respectively, which are suitably secured together such as by welding. The tubular construction provides a chamber 36 at the outer end of tubular body portion 12 and which is covered at the outermost end of the body portion by end wall 38 of hand grip 14. In accordance with the present invention, an audible signal producing arrangement 40 is mounted in chamber 36 and, as will become apparent hereinafter, is operable in the storage position of the anti-theft device to produce an audible signal when the vehicle has been parked and the motor turned off, thereby reminding the operator to install the anti-theft device before leaving the vehicle. Audible signal producing arrangement 40 includes a circuit board 42 suitably supported in chamber 36, such as by providing inner tube 32 with diametrically opposed slots 44 receiving corresponding edge portions of the circuit board and keys 46 removably secured in the outer ends of slots 44 to removably capture the circuit board axially between the inner ends 48 of slots 44 and keys 46.

Figure 2:
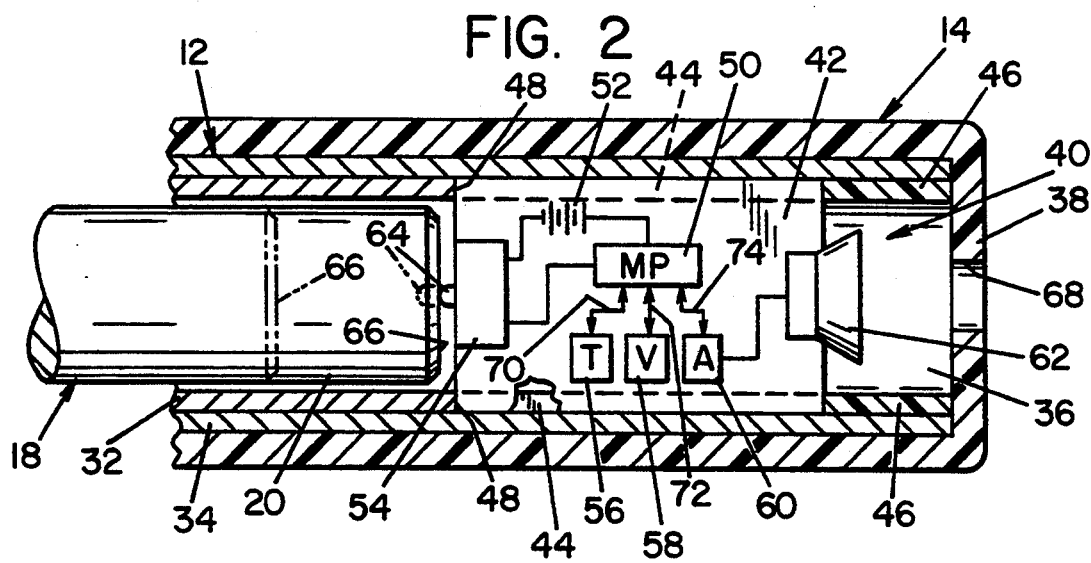
FIG. 2 is a plan view, in section, of the outer end of the tubular body portion of the anti-theft device, taken along line 2—2 in FIG. 1, and showing an audible signal producing circuit in accordance with the invention mounted therein.

Circuit board 42 carries component parts of an electrical circuit which is adapted to be activated when the component parts of the anti-theft device are in the storage positions therefor and which, when activated, is adapted to be actuated during operation of the vehicle in a manner whereby an audible reminder signal is issued when the operator parks the vehicle, turns off the motor and is prepared to leave the vehicle. More particularly in this respect, and as schematically illustrated in FIG. 2 of the drawing, the basic components of the electrical circuit include a microprocessor 50, a battery 52, an activating switch 54, a timer 56, a vibration sensor 58, an audio signal generator 60, and a speaker 62. Battery 52 is preferably replaceable and, for example, may be a long life lithium battery. Activating switch 54 has open and closed positions respectively opening and closing the circuit to microprocessor 50 through battery 52. Switch 54 may, for example, be a micro-switch and, in the embodiment illustrated, includes a plunger 64 by which the switch is opened and closed as set forth more fully hereinafter. Speaker 62 is adapted to output an audible signal which, preferably, is a digitized voice message, such as "please install the CLUB", to remind the vehicle operator to install the anti-theft device before leaving the vehicle. However, it will be appreciated that the speaker can, for example, be a piezoelectric transducer for producing different pitch sounds such as that of a buzzer or a siren. Activating switch 54 is supported on circuit board 42 for engagement of plunger 64 thereof by the inner end face 66 of inner end 20 or rod 18, and speaker 62 is mounted on the circuit board so as to face end wall 38 of hand grip 14 which is preferably provided with an opening 68 therethrough to preclude muffling of the audible signal. Timer 56, vibration sensor 58 and audible signal generator 60 are conventional known types of devices the functions of which are implemented and controlled by microprocessor 50. Timer 56, vibration sensor 58 and signal generator 60 are interconnected with microprocessor 50 by way of signal lines 70, 72 and 74, respectively, and the operation of microprocessor 50 is regulated by a control program that is stored in its memory and which control program is illustrated in flow diagram form in FIG. 3 of the drawing. This flow diagram indicates the major functional capabilities of the audio signal producing circuit and is a distillation of the essential elements of the program that regulates the operation of the various component parts, the details of which are unnecessary for an understanding of the invention described herein and accordingly are not disclosed herein for the purpose of simplicity.

Figure 3:
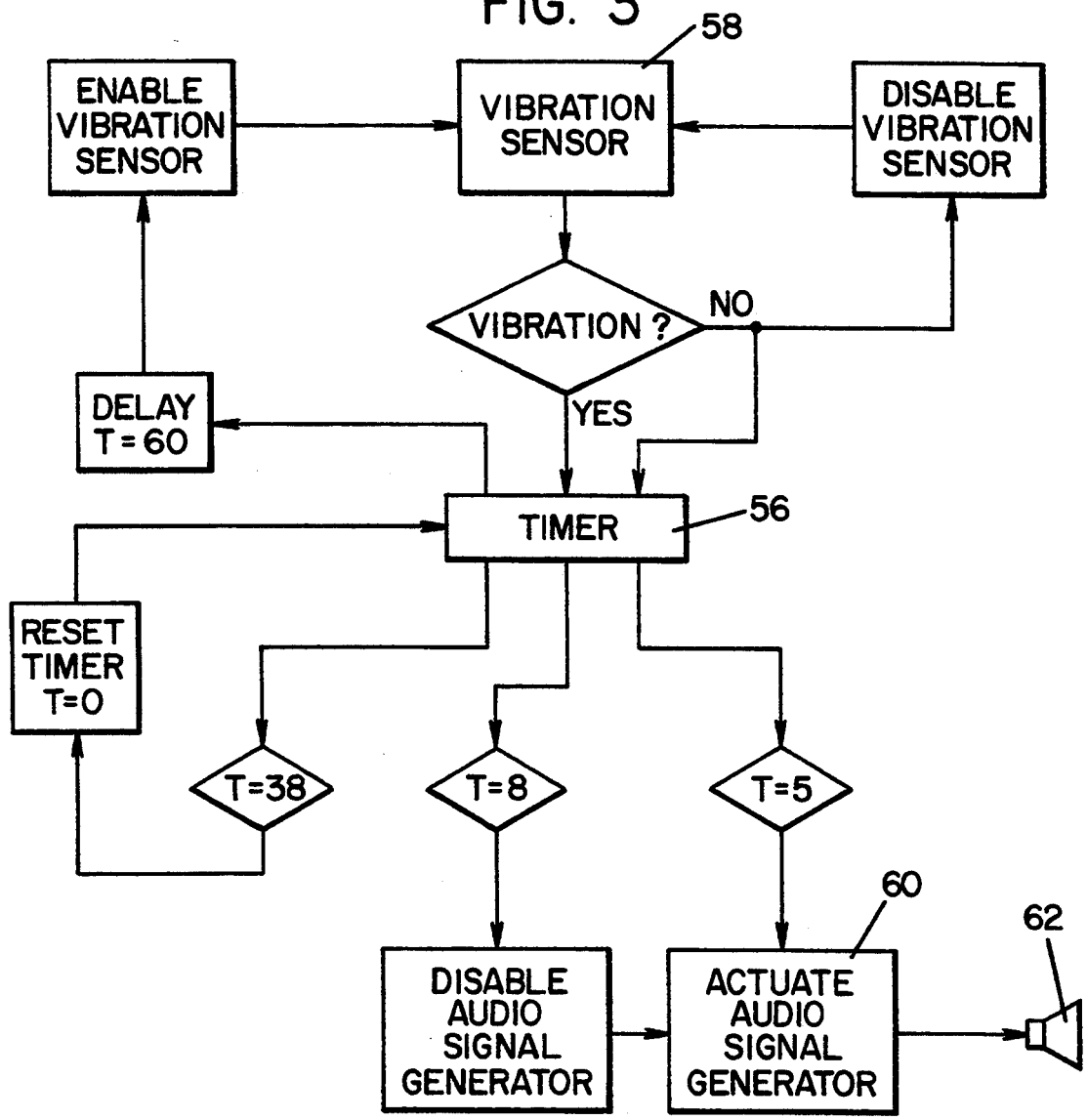
FIG. 3 is a flow diagram of the operation of the audible signal producing circuit.

Referring in greater detail to FIGS. 2 and 3 of the drawing, when the attachment components 22 and 24 of anti-theft device 10 are in the storage positions thereof, inner end 20 of rod 18 is in the solid line position thereof shown in FIG. 2. In this position, inner end 66 of the rod engages and depresses button 64 of activating switch 54, thus closing switch 54 to activate the audible signal producing circuit through microprocessor 50 and battery 52. Presuming that the anti-theft device is stored in a vehicle and the latter is being driven, vibration sensor 58 senses vibration of the anti-theft device resulting from operation of the vehicle and sends a signal to microprocessor 50 via line 72 indicative of such vibration. In response to such signal, microprocessor 50 sends a signal back to vibration sensor 58 via line 72 which enables the vibration sensor to continue to output signals to the microprocessor. So long as vibration is sensed by vibration sensor 72, nothing further happens. When the operator parks the vehicle and turns the engine off, thus terminating vibration of the anti-theft device, vibration sensor 58 sends a second signal to microprocessor 50 which is indicative of zero vibration. In response to this signal from the vibration sensor, microprocessor 50 sends a start signal to timer 56 via line 70 and a "disable" signal to vibration sensor 58 via line 72. After the passage of a predetermined time period, such as five seconds for example, microprocessor 50 sends a signal to audio signal generator 60 via line 74 and which signal is then converted into an audible signal or message output from speaker 62 to remind the operator to install the anti-theft device before leaving the vehicle. After a predetermined time duration for the generation of the audio signal, such as three seconds for example, microprocessor 50 sends a "disable" signal to the audio signal generator 60, whereby the audible output signal is disconnected. If the operator does not proceed to mount the anti-theft device on the vehicle within another predetermined time period following disconnection of the audible signal, such as thirty seconds for example, microprocessor 50 sends a "reset" signal to timer 56 via line 70, resetting the timer to zero, and maintains vibration sensor 58 disabled with respect to outputting a signal to the microprocessor for reinitiating the foregoing sequence of operations. Thus, if the operator leaves the vehicle without installing the anti-theft device, the audible signal producing circuit remains dormant until reactuated by subsequent operation of the vehicle to produce vibrations sensed by vibration sensor 58 and in response to which microprocessor 50 sends an "enable" signal to the vibration sensor to prepare the circuit for issuance of an audible signal in the foregoing manner when zero vibration is subsequently sensed by vibration sensor 58.

If the operator heeds the reminder signal and installs the anti-theft device, such installation results in displacement of rod 18 and thus inner end 20 thereof to the left in FIG. 2, whereby end face 66 moves away from plunger 64 of switch 54 as indicated by the broken line position of end face 66. Such displacement of inner end 20 of rod 18 releases plunger 64 for displacement to the broken line position thereof shown in FIG. 2, thus to open switch 54 and deactivate the audible signal producing circuit. When the operator removes the anti-theft device from its installed position in the vehicle and displaces the component parts of the anti-theft device to their retracted or stored positions, end face 66 of inner end 20 of the rod again engages and depresses switch plunger 64 to activate the circuit.

If the operator does not install the anti-theft device, the output signal of vibration sensor 58 indicative of no vibration remains disabled until such time as the device is again vibrated, such as by starting the vehicle motor. Thus, the audible signal will not continuously operate should the operator choose not to install the anti-theft device upon leaving the vehicle. Preferably, to minimize the possibility of the audible signal being issued following removal of the anti-theft device in the vehicle and collapsing and storing the same, which requires time and upon collapsing of the component parts of the device causes the circuit to be reactivated, microprocessor 50 operates through timer 56 in response to an initial signal from vibration sensor 58 indicative of vibration to delay enabling of the vibration sensor to output a signal indicative of no vibration for a predetermined period of time such as two minutes. Thus, for example, should the anti-theft device be accidentally moved while in storage or otherwise in a dormant, nonvibrating environment, the audible signal producing circuit will not be actuated unless such vibration continues uninterrupted for a period corresponding to the predetermined delay.

While considerable emphasis has been placed herein on the structure and operation of the preferred embodiment, it will be appreciated that many embodiments of the invention can be made and that many changes can be made in the preferred embodiment without departing from the principles of the invention. In this respect, for example, the anti-theft device could be of the character having one end permanently attached to the vehicle and the other end provided with an attachment component which is extendable and retractable relative to the fixed end of the device to achieve installation thereof. Still further, with regard to activating switch 54, it will be appreciated that the latter can be other than of the pushbutton type herein described and could, for example, include inner end 20 of rod 18 as a portion of the switch. In this respect, circuit board 42 could support a pair of contacts which would be engaged by end face 66 of steel rod 18 which would thus bridge the contacts and complete the electrical circuit therebetween. These and other changes as well as other embodiments of the invention will be suggested and obvious to those skilled in the art upon reading the description of the preferred embodiment herein disclosed, whereby it is to be distinctly understood that the foregoing descriptive matter is to be interpreted merely as illustrative of the invention and not as a limitation.

Having thus described the invention it is claimed:

1. In a vehicle anti-theft device mountable in a vehicle to limit rotation of a vehicle steering wheel and comprising first and second attachment means displaceable relative to one another between mounting and storage positions, the improvement comprising: vibration responsive electric circuit means on said device for producing an audible signal when said attachment means are in said storage position, said circuit means including means for sensing vibration of said device and producing a control signal indicative of no vibration of said device, audio signal generating means, and means to transmit said control signal to said signal generating means to generate an audible sound in response to said control signal.

2. The improvement according to claim 1, wherein said means to transmit said control signal includes timing means for delaying transmission of said control signal to said audio signal generating means to delay generation of said audible sound for a predetermined period of time.

3. The improvement according to claim 1, wherein said means to generate an audible sound includes means to issue a digitized voice message.

4. In a vehicle anti-theft device mountable in a vehicle to limit rotation of the vehicle steering wheel and comprising first and second attachment means displaceable relative to one another between mounting and storage positions, in which said device is respectively connected to and disconnected from said steering wheel, the improvement comprising: vibration responsive electric circuit means on said device for producing an audible signal when said attachment means are in said storage position, said circuit means including switch means, and switch actuator means on one of said first and second attachment means for closing said switch means and said circuit means when said attachment means are in said storage position and for opening said switch means and said circuit means when said attachment means are displaced from said storage position towards said mounting position thereof.

5. The improvement according to claim 4, wherein said device includes tubular body means having opposite ends, said one of said first and second attachment means being slidably received in one of said opposite ends and having an inner end displaceable between inner and outer positions relative to the other of said opposite ends, said circuit means being between said other of said opposite ends and said inner end of said one of said first and second attachment means, and said inner end of said one of said first and second attachment means providing said switch actuator means.

6. In a vehicle anti-theft device mountable in a vehicle to limit rotation of the vehicle steering wheel and comprising first and second attachment means displaceable relative to one another between mounting and storage positions, the improvement comprising: vibration responsive electric circuit means on said device for producing an audible signal when said attachment means are in said storage position, said device including tubular body means, said circuit means being in said tubular body means, means including one of said attachment means for respectively opening and closing said circuit means when said attachment means are in said mounting and storage positions, said circuit means including means for sensing vibration of said device and producing a control signal indicative of no vibration of said device, audio signal generation means, and means to transmit said control signal to said signal generating means to generate an audible sound in response to said control signal.

7. The improvement according to claim 6, wherein said means for transmitting said control signal includes timing means for delaying transmission of said control signal to said audio signal generating means to delay generation of said audible sound for a predetermined period of time.

8. The improvement according to claim 7, wherein said audible sound has a selected time period, and said timing means transmits said control signal to said signal generating means for said selected time period.

9. The improvement according to claim 8, wherein said means to generate said audible sound includes means to issue a digitized voice message.

10. In a vehicle anti-theft device mountable in a vehicle to limit rotation of the vehicle steering wheel and comprising first and second attachment means displaceable relative to one another between mounting and storage positions, in which said device is respectively connected to and disconnected from said steering wheel, the improvement comprising: vibration responsive electric circuit means on said device for producing an audible signal when said attachment means are in said storage position, said circuit means including means for sensing vibration of said device and producing a control signal indicative of no vibration of said device, audio signal generating means, means including timing means for transmitting said control signal to said signal generating means to generate an audible sound in response to said control signal, and said timing means transmitting said control signal to said signal generating means for a predetermined time period.

11. The improvement according to claim 10, and means including said timing means for delaying transmission of said control signal to said signal generating means to delay generation of said audible sound for a given time.

12. In a vehicle anti-theft device secured to the steering wheel of a vehicle to limit rotation thereof and comprising tubular housing means having opposite ends and supporting first attachment means, and second attachment means including rod means slidably received in one of said opposite ends and having inner end means displaceable toward and away from the other of said opposite ends to respectively position said second attachment means in storage and mounting positions relative to said first attachment means, the improvement comprising: electric circuit means in said housing means between the other of said opposite ends thereof and said inner end means of said rod means, means including said inner end means of said rod means for activating said circuit means when said second attachment means is in said storage position and to deactivate said circuit means when said second attachment means is in said mounting position, said circuit means comprising vibration detecting means having first and second outputs respectively representing vibration and no vibration of said device, means for producing an audible signal, and means operable when said circuit means is activated to transmit said second output to said means for producing an audible signal to produce an audible signal in response to said second output of said vibration detecting means.

13. The improvement according to claim 12, wherein said means for activating said circuit means includes switch means in said circuit means having open and closed positions respectively opening and closing said circuit means, said switch means including actuating means, and said inner end means of said rod means engaging said actuating means in said stored position of said second attachment means to close said switch means.

14. The improvement according to claim 12, wherein said means to transmit said second output includes timing means for transmitting said second output to said means for producing an audible signal for a predetermined time interval after said second output of said vibration detecting means.

15. The improvement according to claim 12, wherein said audible signal is a digitized voice message.

16. The improvement according to claim 12, wherein said means to transmit said second output includes timing means for delaying transmission of said second output to said means for producing said audible signal.

17. The improvement according to claim 16, and said timing means transmitting said second output to said means for producing said audible signal for a predetermined time interval after said delay in transmitting said second output of said vibration detecting means.

18. The improvement according to claim 17, wherein said means for activating said circuit means includes switch means in said circuit means having open and closed positions respectively opening and closing said circuit means, said switch means including actuating means, and said inner end means of said rod means engaging said actuating means in said storage position of said second attachment means to close said switch means.

19. The improvement according to claim 18, wherein said audible signal is a digitized voice message.

* * * * *